Patented May 16, 1950

2,508,203

UNITED STATES PATENT OFFICE 2,508,203

PROCESS FOR DYEING ANIMAL HAIRS WITH ANTHRAQUINONE VAT DYESTUFFS

Arthur E. Weber, Ridgewood, N. J., assignor to Allied Chemical & Dye Corporation, New York, N. Y., a corporation of New York No Drawing. Application August 17, 1948, Serial No. 44,796

9 Claims. (Cl. 8—36)

This invention relates to a process for dyeing animal hairs with anthraquinone vat dyes.

The vat dyes, as is well known, are insoluble in water and cannot be used directly for dyeing. These dyes, however, all have the common characteristic of possessing one or more reducible $>C=O$ groups, which upon treatment with reducing agents become reduced to $>C-OH$, a form of the dye called the "leuco" compound. This form is soluble in alkalis. Alkaline solutions of the "leuco" compounds possess a considerable affinity for fibres and also have the property of being readily reoxidized to the colored compound on treatment with air or other oxidizing agents, with formation of the original dyestuff.

Accordingly, it has been common practice in the past to dye cellulose fibres such as cotton by immersing them in an alkaline dye bath of the reduced vat dye to absorb the leuco compound, and then removing the fibres and reoxidizing the leuco compound to form the insoluble color in and on the fibres. In this way the color becomes firmly fixed, resulting in exceedingly "fast" dyeings.

Not only are the vat dyestuffs the fastest colors known but they possess as well a high degree of brilliance and purity, and are available in a complete range of shades.

In the past, however, the vat dyes have been used almost exclusively for dyeing vegetable fibres, especially cotton, since the alkali necessary to keep the dye in solution tends to dissolve and deteriorate animal hairs even on short exposure to the dye bath. Efforts have been made in the past to adapt the anthraquinone vat dyestuffs, for use in dyeing wool and other animal hairs. These efforts were unsuccessful except in a few isolated cases such as dyestuffs of the character of dibenzoyl-1,5-diamino-anthraquinone (Schultz 817, C.I. 1132), and perhaps others, which could be maintained in solution at relatively low alkalinity, i. e., at pH values well below 12, and even in such cases produced only dull, weak shades. In the great majority of cases it was impossible to reduce the amount of alkali to a sufficient extent to avoid deterioration of the animal fibres, as such reduction would have brought the quantity of alkali below the practically irreducible minimum of alkali necessary to keep the leuco compound in solution and assure satisfactory penetration and resulting strong dyeing of the goods. Other indirect efforts have taken a number of forms such as using protective colloids, etc., which proved to be unsatisfactory because they failed to preserve the strength and soft hand of the fibres. Another effort to expand the use of the vat dyes to animal fibres took the form of converting the dry leuco compounds to water-soluble forms, for example, by treatment of the leuco compound with chlorosulfonic acid in the presence of a tertiary base or by the action of an alkyl ester of chlorosulfonic acid in the presence of a metal and a tertiary base. These water-solubilized vat dyes, while making possible the use of this type of dyes on wool, were unsatisfactory for a number of reasons including the resulting comparatively weak and dull dyeings, as well as the added great expense of solubilizing the dye. Although some of the prior art efforts have been partially successful in adapting certain of the anthraquinone vat colors for use in dyeing silk, (an animal fibre of the extruded type, not an animal hair, and hence more resistant to caustic alkali than animal hairs such as wool), none of the prior art efforts proved successful in simultaneously achieving, with respect to animal hairs, the two requirements of good dyeings of (1) a clear strong dyeing together with (2) substantial preservation of the strength of the hairs dyed.

It is an object of my invention to provide a process for dyeing animal hairs with dyes of the type of anthraquinone vat dyes.

It is another object of my invention to provide a process for dyeing animal hairs with anthraquinone vat dyestuffs of such character that their leuco forms are substantially completely soluble in alkalis only at true pH values above about 12.

It is a further object of the invention to provide a process of the character described in which no changes are necessary in the dyestuff itself.

It is a still further object of the invention to provide a process of the character described in which strong, clear dyeings are obtained with no undue deterioration in the tensile strength of the dyed hair.

It is a still further object of the invention to provide a process for dyeing wool with anthraquinone vat dyestuffs in which strong, clear dyeings are obtained with no undue deterioration in the tensile strength of the dyed wool.

These and other objects are accomplished according to my invention wherein animal hairs are dyed with anthraquinone type vat dyestuffs in dye baths of alkalinity such that their true pH values lie between about 12 and about 13, and which contain, in addition to the alkaline material, an excess of alkali metal hydrosulfite and controlled quantities of salt.

Among the animal hairs adapted to be dyed according to my invention are all animal hairs of the character of fleece and fur, such as the fleece of sheep, goats, camels, etc., and also fur such as rabbit fur used in the manufacture of felt hats. The invention is primarily concerned with the coloring of hair derived from sheep, generally known as wool, in all phases of its processing, such as raw stock, top, sliver, woolen and worsted yarns, knitted, woven and felted fabrics. The present invention also deals with the dyeing of animal hairs or yarns and fabrics made therefrom which have been altered by chemical processing such as acid or alkaline chlorination, treatment with formaldehyde, strong alkalis, oxidizing agents, ethylene dibromide plus sodium hydrosulfite, and similar preliminary treatments. My process likewise is adapted to the coloring with the vat colors described, of animal hairs present in yarns or fabrics in combination with other fibres in which the animal hair constitutes the major part of the yarn or fabrics, such as, for example, 75% wool and 25% viscose, or 60% mohair and 40% cellulose acetate.

In carrying out the process of my invention, an aqueous alkaline dye bath is prepared containing an alkali, an alkali metal hydrosulfite, and a salt; and containing sufficient alkali to keep the leuco compound substantially completely in solution. The dye bath thus prepared is substantially similar to vats used in dyeing cotton with such dyes except that (1) the quantity of hydrosulfite used is in excess of that required to keep the dyestuff in the leuco form, and (2) a quantity of salt is added, even in the dyeing of such colors which are normally dyed on cotton without salt. The salt may be either common salt such as sodium chloride or Glauber's salt, i. e. sodium sulfate, or other neutral alkali metal salt. The dye bath will thus contain the anthraquinone vat dyestuff, an excess of hydrosulfite over that required to keep the dyestuff reduced to the leuco form; an alkali such as sodium hydroxide in sufficient concentration to keep the reduced dyestuff completely in solution, i. e. sufficient to produce an orange color reaction with thiazol yellow test paper, so-called "Clayton yellow" test paper, that is, to sure a pH value between about 12 and about 13, and in addition, a quantity of salt varying according to the particular dyestuff, the weight of the wool and strength of the dyeing to be made, but which should be at least about 5 grams of salt per liter, on an anhydrous basis, preferably between about 5 and 50 grams per liter, i. e. between about .5% and 5% of salt based on the weight of the dye liquor.

In the method of my invention a number of critical features must be observed which are collectively responsible for the success of my process and enable strong brilliant dyeings to be made on wool and similar animal hairs with anthraquinone vat dyes of the character described, without undue attendant injury to the strength and character of the hairs. The critical features of my invention are (1) the use of salt, (2) the use of an excess of alkali metal hydrosulfite, and (3) the maintenance of the dye bath at all times of an alkalinity corresponding to a pH between about 12 and about 13, i. e., sufficient to give a faint to considerable orange stain with "Clayton yellow" test paper.

The use of salt and the excess of hydrosulfite are critical factors, and appear to contribute markedly to the avoidance of deterioration in the tensile strength of the dyed material by the high alkalinity of the bath as well as to aid in the deposition of the dyestuff upon the animal hairs, although the mechanism of the protective action is not at all clear. However, I use a quantity of salt of at least about 5 grams per liter of dye liquor or sufficient to provide at least about a .5% solution, as brought out above, and there should preferably be present an amount varying from 5 to 50 grams per liter on an anhydrous basis, depending upon the particular dyestuff and the strength of dyeing desired, the larger amount being used when darker shades are desired or when dyeing such vat dyestuffs which do not otherwise "draw" satisfactorily.

The salt should preferably all be added to the dye bath as originally prepared before the material to be dyed is entered, but in some cases it may be desirable to defer addition of part or all the salt until the dye bath has been brought to dyeing temperature. However, when such temperature has been reached, the salt concentration of the dye liquor should be at least about .5%, or 5 grams of salt per liter.

The alkalinity of the bath is important. The pH value of the vat, due to the presence of sodium hydroxide or its equivalent, used in my process is higher than the pH values previously considered tolerable for use in wool dyeings, and is comparable to that customarily employed in dyeing cotton with the anthraquinone vat dyes. The amount and character of alkali added to the dye bath in any specific case will be determined by the particular dyestuff used, the "length" of the dye bath, i. e. the ratio of the volume of the dye liquor to the weight of material to be dyed, the temperature of the bath, dyeing time and the like as is well known in the art. However, regardless of the above variations, the amount of alkali present in the dye bath should be sufficient at all times to show a persistent faint to considerable color change with Clayton yellow test paper; that is, to produce a pH value between about 12 and about 13. The test paper should not show the complete color change from yellow through orange to red, characteristically produced on Clayton yellow test paper by solutions wherein pH is increased from about 12 to about 14, but should show at least a faint orange color but not more than a distinct orange color. Clayton yellow changes from a lemon yellow through orange to red at a true pH between about 12 and about 14 regardless of the presence of excess alkali metal ions. It is therefore especially suitable for use in testing the pH of my dye baths, which contain an excess of alkali metal ions through the addition of salt, excess hydrosulfite, etc., since the apparent pH values as measured by certain glass electrode type pH meters tend to be unreliable for pH values above about 10 and will be radically altered by such excess alkali metal ions although the alkalinity may remain constant. Thus the true pH of my dye baths may vary between about 12 and about 13, whereas the apparent pH as read on a glass electrode type pH meter without applying the needed corrections may vary between about 10.8 and about 11.8.

The alkali used will preferably be made up primarily of an alkali metal hydroxide, but may be augmented or partially replaced by other alkalis such as trisodium phosphate, alkali silicates, alkali metal carbonates or the like, provided the total alkalinity is sufficient to provide the pH range as measured by the orange color test described above.

In cases where residual acid is left on the hair from previous processing, such acid must, of course, either be neutralized preceding the vat dyeing or the quantity of alkali used in the bath must be increased by the amount necessary to neutralize whatever acid is present in the material.

While the alkalinity of the dye bath may vary within the pH range specified, the bath will usually be somewhat more alkaline at the start of the dyeing than at the end. Usually the dye bath will be made up initially to show a distinct orange color change on Clayton yellow test paper, and the alkaline character of the bath should be maintained throughout the dyeing so that during and at the end of the dyeing it shows at least a faint orange coloration with the Clayton yellow test paper.

The temperature of the dye bath is usually maintained within a relatively much narrower range than for comparable cotton dyeings, namely, between about 90° F. and about 125° F. regardless of the dyestuff used, preferably between about 100° F. and about 115° F. when the dyeing is carried out in conventional wool dyeing equipment; as compared to temperatures varying between about 70° and about 140° F., depending on the dyestuff used, in the normal cotton dyeing process. The temperature used will depend somewhat on the dyeing time, a lower temperature requiring a longer dyeing time, and on other conditions, as brought out below. The goods are preferably entered into the bath at about 90° F., and the temperature thereafter is raised to the dyeing temperature.

The time of dyeing will usually be at least about 10 minutes, and usually varies between about 10 and about 60 minutes total time including the time required to bring the dye bath to the dyeing temperature. The dyeing time will depend somewhat on the temperature as well as on other dyeing conditions, for example, dyeing times of from 15 to 60 minutes are suitable at temperatures ranging from 90° to 125° F. for dyeing in conventional wool dyeing equipment, whereas considerably shorter times will suffice, and higher temperatures may be used with suitable continuous high speed dyeing equipment.

A quantity of alkali metal hydrosulfite will be used as a constituent of my dye bath, as is customary in dyeing with anthraquinone vat dyestuffs. The hydrosulfite reduces the dye to the leuco form and maintains it in the leuco state in the dye bath. However, the quantity of hydrosulfite used should not only be sufficient to perform this function, but should be substantially in excess of this amount and preferably should be at least about equal to the amount of alkali metal hydroxide used in the bath. I have found that the use of an excess of alkali hydrosulfite contributes toward the protection of the wool from deterioration by the alkali of the bath. Accordingly, I prefer to use a quantity of hydrosulfite equal to between about 1 and 2½ times the amount by weight of alkali present in the bath, instead of amounts used in the prior art, which are normally less than the weight of the alkali used.

The animal hair or fabric should be well scoured and may be wetted with water before entering into the dye bath but, if desired, may be entered into the bath in the dry state. When this dry method is used, the material should, in case of constructions which do not wet readily, such as flannel, be treated with a wetting agent and should retain a sufficient amount of wetting agent to enable the dye liquor to penetrate into the fibres within a few seconds after the goods are entered. This treatment insures good penetration of the dye and great brilliancy and solidity of shade. Any suitable wetting agent may be used for this purpose, e. g. an alkyl aryl sulfonate type wetting agent such as that known in the trade as Nacconol NR which contains about 40% of an alkyl aryl sodium sulfonate and about 60% of sodium sulfate.

Actual dyeing of the material according to my invention is carried out according to approved dyeing practice except for the modifications enumerated. The material is first scoured, then, if desired, treated with a wetting agent in any suitable manner, is entered into the dye bath, brought to temperature and maintained at the desired temperature for the appropriate length of time. Before entering the goods to be dyed, the dye bath is made up with water, alkali, hydrosulfite, salt, reduced dyestuff and, if desired, a wetting agent such as sulfonated castor oil. The bath is tested with Clayton yellow test paper to assure a faint to appreciable orange reaction characteristic of Clayton yellow at pH values between about 12 and about 13. The Clayton yellow, or thiazole yellow test paper used, is prepared as is well known, by impregnating filter paper with a .25% solution of thiazole yellow dye, Colour Index No. 813, and thereafter allowing it to dry. The test paper is sensitive to free alkali, turning from a lemon yellow through orange to red as the pH value progressively increases from about 12 to about 14.

The dye bath ratios used are those in common use, and these ratios depend on the material being dyed and the depths of shade desired and also on the type of equipment used as is well known. Thus the dye bath ratios may vary widely, for example from about 8:1 up to about 60:1, but preferably will range between about 10:1 and 15:1 for closed type dyeing equipment, and between about 30:1 and 50:1 for open type dyeing equipment.

After the dye bath is prepared the goods are entered into the bath preferably at temperatures somewhat below the temperature of dyeing, for example between about 90° and 95° F. and are dyed at the temperatures and for the lengths of time indicated above. After dyeing, the color may be developed by oxidation in any suitable manner as known in the art.

Animal hairs dyed according to the process of my invention are not unduly deteriorated in tensile strength over that exhibited by the undyed material; in fact, deterioration is often less than that produced by chrome dyeings and is usually less than that caused by various commonly used preliminary treatments, such as chlorination and other anti-shrinkage treatments, whereas wool fabric, dyed according to the cotton process for dyeing anthraquinone vat dye colors, will exhibit losses in breaking strength so great as to render the fabric unfit for use.

The vat dyestuffs which may be applied according to the process of my invention are those of the well known so-called anthraquinone vat dyestuffs, such as listed in Rowe's Colour Index, section XXIV, and especially those whose leuco form requires that the pH of the alkaline solution be above about 12 to maintain them in substantially complete solution. Examples of a number of dyestuffs whose leuco form requires that the pH of the alkaline solution be above about 12 to maintain them in substantially complete solution are given below with the Schultz "Farbstoff "Tabellen" numbers, Colour Index numbers, or "Prototype" numbers:

|  | Schultz Number | Colour Index Number |
|---|---|---|
| Anthraflavone G, GC | 759 | 1,095 |
| Carbanthrene Golden Orange G | 760 | 1,096 |
| Carbanthrene Golden Orange RRT | 762 | 1,098 |
| Carbanthrene Dark Blue DR | 763 | 1,099 |
| Indanthrene Violet RT | 764 | 1,100 |
| Carbanthrene Brilliant Green | | 1,101 |
| Carbanthrene Black B, BS | 765 | 1,102 |
| Carbanthrene Violet R | 766 | 1,103 |
| Carbanthrene Violet 2R | 767 | 1,104 |
| Indanthrene Violet B | 768 | 1,105 |
| Carbanthrene Blue RS | 837 | 1,106 |
| Carbanthrene Blue 3G | 840 | 1,109 |
| Indanthrene Blue 5G | 844 | 1,111 |
| Indanthrene Blue CE | | 1,112 |
| Carbanthrene Blue GCD-G, GCD-RN | 842 | 1,113 |
| Carbanthrene Blue BCS, BCF | | 1,114 |
| Indanthrene Blue GC | 843 | 1,115 |
| Indanthrene Green 2B | 847 | 1,116 |
| Carbanthrene Yellow G | 849 | 1,118 |
| Indanthrene Grey B | 848 | 1,123 |
| Indanthrene Red G | 826 | 1,140 |
| Indanthrene Red R | 830 | 1,142 |
| Indanthrene Bordeaux B | 828 | 1,146 |
| Indanthrene Brown GR | 873 | 1,149 |
| Carbanthrene Olive R | 833 | 1,150 |
| Carbanthrene Brown AR | | 1,151 |
| Carbanthrene Brown AG | | 1,152 |
| Carbanthrene Violet BNX | 832 | 1,163 |
| Indanthrene Olive G | 791 | 1,167 |
| Cibanone Orange R | 792 | 1,169 |
| Cibanone Yellow R | 795 | 1,170 |
| Cibanone Blue 3G | 793 | 1,173 |

|  | Prototypes A. A. T. C. C. Year Book 1946 |
|---|---|
| Carbanthrene Flavine GC | 9 |
| Carbanthrene Brilliant Violet 4R | 117 |
| Carbanthrene Brown BR | 118 |
| Carbanthrene Brown GGA | 119 |
| Carbanthrene Khaki 2G | 122 |
| Indanthrene Pink B | 123 |
| Carbanthrene Red G2B | 124 |
| Carbanthrene Yellow Brown 3G | 125 |
| Indanthrene Brilliant Orange GR | 287 |
| Indanthrene Brilliant Violet 3B | 288 |
| Indanthrene Direct Black RB | 289 |
| Carbanthrene Golden Orange 3G | 290 |
| Carbanthrene Olive Green B | 293 |
| Carbanthrene Red FBB | 296 |

My process is adapted for use in any suitable known types of vat dyeing equipment, for example in either open or closed equipment. The dyes may be applied to the animal fibres in solution in standard vat dyeing equipment or they may be applied or "padded" as a pigment suspension or as a "vat acid" (Kuepensaeure) suspension as is well known in the dyeing art, and the goods may then be developed in a solution of caustic alkali together with hydrosulfite and salt in a "jig" or other suitable equipment. If the dyes are to be padded by the vat acid process, i. e. by the Kuepensaeure process, the dye is first dispersed in a solution containing water, an alkali and a dispersing agent such as a formaldehyde condensation product of naphthalene sulfonic acid (Tamol NNO), and then reduced to the leuco compound with alkali hydrosulfite and transformed to the vat acid with acetic acid, sulfuric acid, etc., as is well known. In the application to the goods of the dyestuffs in pigment suspensions, the dye is applied (padded) at relatively high temperatures (140–160° F.) and is then developed or fixed at the lower temperatures indicated, in a bath similar to those described for solution dyeing except for the absence of dyestuff. The concentrations of materials as well as times and temperatures in the developing bath are similar to those recommended for the dye bath dyeings previously described.

The following specific examples will further serve to illustrate my invention:

*Example 1.*—Anthraquinone vat-dyeings were made on all wool flannel as follows:

Weight of material—approx. 9 oz. per yard (based on 56″ width).
Warp—worsted yarn.
Filling—wool yarn.

Two strips A and B of the above flannel, 15 yards long and 6 inches wide, weighing 425 grams, were treated with 3% of an alkyl aryl sulfonate wetting agent (Nacconol NR) and 0.7% ammonia (26%) for 20 minutes at 100° F., extracted and dried. (This material is referred to as "scoured only.") Strip A was wound full width around the perforated shaft of a 1 lb. laboratory package-dyeing machine, and was then dyed with Carbanthrene Blue GCD-G double paste (C. I. 1113) under the conditions listed under "A, Conventional process" in the table below. The alkalinity of the dye bath was such that an orange coloration characteristic of a true pH between about 12 and about 13 was obtained when the dye liquor was tested with Clayton yellow test paper. After dyeing and rinsing with cold and hot water, the cloth was removed from the machine and, in rope form, rinsed at 110° F. in a liquor containing 4 grams alkyl aryl sulfonate wetting agent per liter.

Strip B was handled as A but was colored as given in the table below under "B, Novel process."

The tensile strengths of both warp and filling of the dyed strips "A" and "B" as well as on the "scoured only" material were determined on a Scott tester, and are also listed in the following table. The value recorded is the number of pounds pull required to break the goods, and thus a low value denotes a low strength, a high value a high strength. The increase in tensile strength of strip "B" over the undyed "scoured only" material is believed to be due to a slight degree of felting which takes place in the vat dyeing process.

*Vat dyeings of wool flannel with carbanthrene blue GCD-G–Double paste*

|  | Material "Scoured only" | Material dyed under the following conditions: | |
|---|---|---|---|
|  |  | "A-Conventional Process" for cotton | "B-Novel Process" |
| Dyestuff used |  | 8% Carb. Blue GCD-G Double Paste | 8% Carb. Blue GCD-G Double Paste. |
| Caustic soda, NaOH, dry |  | 4.8 gms. per liter (4 lbs. per 100 gal.) | 4.8 gms. per liter (4 lbs. per 100 gal.). |
| Sodium hydrosulfite Conc. (Na₂S₂O₄) |  | 3.6 gms. per liter (3 lbs. per 100 gal.) | 7.78 gms. per liter (6½ lbs. per 100 gal.). |
| Common salt, NaCl |  | none | 30 gms. per liter (25 lbs. per 100 gal.). |
| Alkalinity |  | orange to Clayton yellow paper | light orange to Clayton yellow paper. |
| Time of dyeing |  | 30 minutes | 20 minutes. |
| Temperature |  | 130° F | Started 95° F. heated to 105° F. run 10′ at 105° F. |
| Rinses after dyeing |  | 15 min. in cold water, 10 min. in hot water | 15 min. in cold water, 10 min. in hot water |

*Vat dyeings of wool flannel with carbanthrene blue GCD-G-Double paste*—Continued

| | Material "Scoured only" | Material dyed under the following conditions: | |
|---|---|---|---|
| | | "A-Conventional Process" for cotton | "B-Novel Process" |
| Results: | | | |
| Shade and strength | | fair shade and strength | full shade of Royal Blue, much brighter and richer than "A" |
| Feel of material | soft | harsh and "cottony" | soft "woolly" touch |
| Resistance to tearing (by hand) | good | poor, appears very tender | good. |
| Tensile strength per inch (Scott Tester) (average of 5 tests): | | | |
| Warp | 39.5 lbs | 35.0 lbs | 42.0 lbs. (20% stronger than "A"). |
| Filling | 27.2 lbs | 17.2 lbs | 28.0 lbs. (63% stronger than "A"). |

*Example 2.*—To 1.0 gram of Carbanthrene Blue GCD-G Double Paste, C. I. 1113, were added 0.4 ml. Sulfonated castor oil.
    90.0 ml. Water at 150° F.
    10.0 ml. Caustic soda (of a 10% solution by volume, i. e. 10 grams NaOH per 100 cc. of solution).

Approx. 100 ml. at 140° F.

Then there was added 1.0 gram sodium hydrosulfite conc. (Hydro) and the bath was reduced for 10 minutes with occasional stirring. The stock vat thus obtained was poured into a dye bath prepared as follows:

640.0 ml. Water.
    25.0 ml. Common salt (of a 20% solution by volume, i. e. 20 grams of salt per 100 ml. of salt solution).
    8.0 ml. NaOH 10% by volume.
    2.6 gm. Hydro.

Approx. 675.0 ml.
    100.0 ml. Stock vat as prepared above.

775.0 ml. at 100° F.

The dye bath was then tested with Clayton yellow test paper and found to produce an orange coloration on the paper. Then 20 grams of a light weight (5½ oz. per yard, 56" wide) worsted material, lightly chlorinated, were prepared with an alkyl aryl sulfonate wetting agent and ammonia, as described above and dyed in the above liquor (a 40:1 dye bath ratio) as follows:

The material was entered dry, worked for 5 minutes at 100° F. when an addition of 25 ml. of a 20% solution of NaCl was made and the cloth worked for another 5 minutes. The temperature was then raised to 110° F. within 10 minutes, and the dyeing continued at this temperature for an additional 10 minutes. The goods were then passed through squeeze rollers, aired for 10 minutes, rinsed well with cold water until free of alkali. The oxidation was completed by a treatment for 15 minutes in a bath containing 3% potassium persulfate, starting at 110° F. and raising the temperature gradually to 140° F. The material was then soured with 10% sulfuric acid for 10 minutes at 180° F., rinsed twice with warm water, followed by a treatment for 15 minutes at 140° F. in a bath containing 2½ grams "Nacconol NR" per liter, and finally another warm water rinse. Extracted and ironed without tension.

Based on the weight of the wool, the amounts of dyestuffs and chemicals used in Example 2 are as follows:

5% Color paste
2% Turkey red oil (sulfonted castor oil)
9% Caustic soda (dry)
18% Hydro
50% Common salt (NaCl)

A level dyeing was obtained of good penetration and of a depth at least equal to a 5% dyeing of the same color on cotton. The tensile strength of the cloth, both in warp and filling was found to be practically equal to the breaking strength of the undyed material.

*Example 3.*—20 grams of cloth, identical with the material used in Example 2, were dyed with:

5.0% Carbanthrene Flavine GC Double Paste (Prototype 9)
2.0% Turkey red oil
7.5% Caustic soda
15.0% Hydro
50.0% Common salt following the procedure used in Example 2. A full shade of a bright greenish yellow was obtained, which is at least equal in depth to a 5% dyeing of Carbanthrene Flavine GC Double Paste on cotton, and is of similar fastness properties, and tensile strength only slightly below that of the undyed cloth.

*Example 4.*—20 grams of worsted cloth as used in Example 2, were dyed as follows:

Stock vat: 1.0 gm. Carbanthrene Golden Yellow GK Double Paste (Prototype 291)
    0.4 ml. Turkey red oil
    90.0 ml. Water
    10.0 ml. NaOH, 10% solution Approx. 100.0 ml. at 140° F.
Add    1.0 gm. Hydro, reduce 10 minutes at 140° F. and pour into dye bath made up as follows:

620.0 ml. Water
    30.0 ml. Trisodium phosphate (Na₃PO₄.12H₂O), 10% solution
    50.0 ml. Common salt 20% solution
    2.0 gm. Hydro
    (100.0 ml. Stock vat)

Approx. 800.0 ml.

Material was worked at 100° F. for 10 minutes, the bath was then heated within 5 minutes to 110° F. and the dyeing continued for another 15 minutes at 110° F. Shade was developed as in Example 2. The composition of the dye bath in Example 4 is:

5% Dyestuff paste
2% Turkey red oil
5% Caustic soda
15% Trisodium phosphate crystals ($Na_3PO_4 \cdot 12H_2O$)
15% Hydro
50% Common salt A full shade of a golden yellow color was obtained at least equal in depth to a 5% dyeing of the same dyestuff on cotton and of similar fastness properties, and having a tensile strength only slightly below that of the undyed cloth.

*Example 5.*—(Pigment Pad-Jig Process): A 35 gram strip of densely woven worsted cloth weighing 12 oz. per yard, previously prepared with wetting agent as explained above, was padded at 160° F. with a liquor containing 100 grams per liter of Carbanthrene Golden Orange RRT Grains, a very finely dispersed form of Carbanthrene Golden Orange RRT, C. I. 1098.

The padded cloth was treated as described in previous examples in full width for 30 minutes at 110° F.–120° F. in 700 ml. of a developing bath containing 2.8 grams of NaOH, 5.6 grams of Hydro and 17.5 grams of NaCl. It was then passed through squeeze rollers and finished as described in Example 2. A full shade of orange of fairly good penetration and good tensile strength was obtained.

*Example 6.*—(Kuepensaeure Pad-Jig Process): A pad liquor containing 80 grams of Carbanthrene Blue GCD-G Double Paste (C. I. 1113) per liter, in form of its leuco acid was prepared as follows:

```
        20 gm.   Carbanthrene Blue GCD-G Double Paste
       176 ml.   Water
        16 ml.   Tamol NNO-dispersing agent, of a 50% solu-
                    tion by volume
        24 ml.   NaOH (10% solution)
Approx. 236 ml.  at 140° F.
Add       2.4 gm. Hydro, reduce 10 minutes, add
         14.0 ml. Acetic acid 28% with vigorous stirring
Approx. 250.0 ml. Vat acid pad liquor
```

A 35 gram strip of worsted cloth, as used in Example 5, was padded at 140° F. with the above vat acid suspension and was then developed as given in Example 5. A full shade of blue of good penetration was obtained with no undue reduction in the tensile strength of the cloth.

*Example 7.*—(Kuepensaeure Pad-Jig Process): A 10 gram strip of worsted material, as used in Examples 5 and 6, was padded with a Kuepensaeure bath prepared as follows:

```
        10 gm.   Carbanthrene Brilliant Green Double Paste C. I.
                    1101.
        10 gm.   Carbanthrene Flavine GC Double Paste (Pr. 9).
       324 ml.   Water.
        16 ml.   Tamol NNO dispersing agent, of a 50% solution by
                    volume.
        40 ml.   NaOH 10%.
Approx. 400 ml.  at 140° F.
Add       4 gm.  Hydro, reduce 10 minutes, add, with vigorous stir-
                    ring.
         23 ml.  Acetic acid 28% previously diluted with
         77 ml.  Hot water.
Approx. 500 ml.  Vat acid pad liquor
```

Material padded at 140° F. and treated in full width for 40 minutes at 120° F. in a developing bath containing 300 ml. Water
0.6 gm. NaOH
1.2 gm. Hydro and
7.5 gm. NaCl Shade developed as given in Example 5. A bright yellowish green dyeing of good penetration and good tensile strength resulted.

*Example 8.*—10 grams of tippy wool raw stock were dyed for 30 minutes at a ratio of 40:1, starting at 110° F. and raising the temperature gradually to 120° F., in a bath containing, based on the weight of the wool:

2% Carbanthrene Blue GCD-G Double Paste
2% Turkey red oil
9% Caustic soda
18% Hydro
30% Common salt The raw wool was worked very gently in order to prevent undue felting. The shade was developed as given in Example 2. A dyeing was produced which shows the tippy nature of the material to a lesser degree than do dyeings of Alizarine Acid colors made on the same stock.

*Example 9.*—10 grams of tippy mohair raw stock, previously prepared with a wetting agent as explained above, were dyed for 20 minutes as described in previous examples at a temperature of 110° F.-120° F., ratio 40:1, in a bath containing:

5% Carbanthrene Blue GCD-G Double Paste
2% Turkey red oil
9% Caustic soda
18% Hydro
50% Common salt and were then finished as in Example 2. A dyeing which was equal in depth to a 5% dyeing of Carbanthrene Blue GCD-G Double Paste on cotton was obtained.

*Example 10.*—10 grams of combed sliver, in skein form, were dyed for 30 minutes at 110° F.-120° F., ratio 40:1, in a bath made up as shown in Example 4, and containing:

5% Carbanthrene Brown AR Double Paste (C. I. 1151)
2% Turkey red oil
5% caustic soda
15% Trisodium phosphate crystals
15% Hydro
60% Common salt Oxidized as in Example 2. A bright brown dyeing of outstanding fastness was obtained.

*Example 11.*—10 grams of rabbit's fur were dyed for 25 minutes at 105° F.-120° F., ratio 40:1, in a bath made up with:

5% Carbanthrene Olive R Double Paste (C. I. 1150)
2% Turkey red oil
10% Caustic soda
15% Hydro
80% Common salt Oxidized as in Example 2. An olive drab dyeing of outstanding fastness was produced on the fur, of a depth of shade which is about half the depth obtained on wool with the same amount of dyestuff.

The fur which was used contained a considerable amount of acid left in the material from the carroting process. The amount of caustic soda in the dye bath was, therefore, increased to 10% from 7.5%, which would have been used if the fur had been of neutral reaction.

*Example 12.*—10 grams of bleached carpet yarn were dyed for 30 minutes at 100° F.-110° F. with:

5% Carbanthrene Blue GCD-G Double Paste
2% Turkey red oil
9% Caustic soda
18% Hydro
80% common salt Finished as given in Example 2. A full shade of a bright blue of outstanding fastness properties and good tensile strength was obtained.

My process makes it possible to obtain colored effects on animal hairs with a degree of fastness and brilliancy of shade hitherto unknown on this type of fiber. Thus, a dyeing produced with 2% Carbanthrene Blue GCD-G Double Paste, Color Index 1113, was found to exhibit a lesser degree of fading after 240 hours fadeometer exposure than do dyeings of similar shade and intensity obtained with fast-to-light acid colors (such as Alizarine Sapphire, C. I. 1054 or Alizarine Blue GRL Extra, C. I. 1088) after only 60 hours exposure. Furthermore, dyeings on wool made with Carbanthrene Blue GCD-G are very much faster to washing than are colorings obtained with the anthraquinone acid dyes, and are faster to washing than dyeings made with acid milling colors. Compared with colorings produced on wool with chrome colors, or with metallized acid dyes, dyeings obtained with vat dyes according to my process show considerably greater brilliancy, superior fastness to light and equal or superior wash fastness. A dyeing made with Carbanthrene Brown AR was practically unchanged after 400 hours fadeometer exposure, while a similar shade produced with some of the fastest chrome dyes shows a considerable break after 120 hours, and is very badly faded after 400 hours.

While the above describes the preferred embodiments of my invention, it will be understood that departures may be made therefrom within the scope of the specification and claims.

I claim:

1. In a process for dyeing animal hairs with anthraquinone vat dyestuffs in reduced, alkaline vats, the step which comprises carrying out the dyeing in an anthraquinone vat liquor containing an alkali, an alkali metal hydrosulfite in an amount between about 1 and about 2½ times the amount by weight of the alkali in the liquor, and a quantity of a neutral alkali metal salt between about 5 and about 50 grams per liter of vat liquor, while maintaining the vat at all times during the dyeing sufficiently alkaline to produce a slight to considerable color reaction with Clayton yellow test paper, and at temperatures between about 90° F. and about 125° F.

2. In a process for dyeing animal hairs with anthraquinone vat dyestuffs in reduced, alkaline vats, the step which comprises carrying out the dyeing in an anthraquinone vat liquor containing an alkali, an alkali metal hydrosulfite in an amount between about 1 and about 2½ times the amount by weight of the alkali in the liquor, and a quantity of a neutral alkali metal salt between about 5 and about 50 grams per liter of vat liquor, while maintaining the vat at all times during the dyeing at a pH value between about 12 and about 13, and at temperatures between about 90° F. and about 125° F.

3. In a process for dyeing wool with anthraquinone vat dyestuffs of such character that they are substantially completely soluble in aqueous alkaline solutions only at pH values above about 12, the steps which comprise carrying out the dyeing at temperatures between about 90° F. and about 125° F. in an alkaline vat containing the dyestuff, an alkali metal hydroxide, an alkali metal hydrosulfite in an amount equal to between about 1 and 2½ times the amount by weight of the alkali metal hydroxide, and between about 5 and about 50 grams per liter of sodium chloride, while maintaining the pH of the vat liquor at all times at a pH value between about 12 and about 13.

4. In a process for dyeing animal hairs with anthraquinone vat dyestuffs, the steps which comprise preparing a vat liquor containing the dyestuff, sufficient alkali to maintain the liquor at all times during the dyeing at an alkalinity sufficient to produce a slight to considerable orange color reaction with Clayton yellow test paper, a quantity of an alkali metal hydrosulfite equal to between about 1 and 2½ times the weight of the alkali used, and a quantity of a neutral alkali metal salt equal to between about 5 and about 50 grams per liter of liquor; and carrying out the dyeing for periods between about 15 and about 60 minutes at temperatures between about 90° F. and about 125° F.

5. The process of claim 4 wherein the salt used is sodium chloride.

6. The process of claim 4 wherein the salt is sodium sulfate.

7. The process of claim 4, wherein the animal hairs are wool.

8. In a process for dyeing animal hairs with anthraquinone vat dyestuffs, the steps which comprise preparing a vat liquor containing the dyestuff, sufficient sodium hydroxide to maintain the liquor at all times during the dyeing at an alkalinity sufficient to produce a slight to considerable orange color reaction with Clayton yellow test paper, a quantity of sodium hydrosulfite equal to between about 1 and 2½ times the weight of the sodium hydroxide used, and a quantity of a neutral sodium salt equal to between about 5 and about 50 grams per liter of liquor, and carrying out the dyeing for periods between about 15 and about 60 minutes at temperatures between about 90° F. and about 125° F.

9. The process of claim 8, wherein the animal hairs are wool.

ARTHUR E. WEBER.

REFERENCES CITED

The following references are of record in the file of this patent:

FOREIGN PATENTS

| Number | Country | Date |
|---|---|---|
| 466,810 | Germany | Oct. 11, 1928 |
| 390,513 | Great Britain | Apr. 5, 1933 |

OTHER REFERENCES

"Technical Bulletin" of du Pont de Nemours & Co., Wilmington, Del., vol. 4, No. 2, for June 1948, pages 53–56.

"Vat Dyeing of Wool," by S. J. Luscian, Calco Tech. Bulletin No. 797, published by Calco Chem. Div. of Amer. Cyan. Co., of Bound Brook, N. J., published October 1947, pages 2–4.